United States Patent [19]

Kunz et al.

[11] 4,379,036
[45] Apr. 5, 1983

[54] CONTINUOUS ELECTROCHEMICAL AMMONIA SCRUBBER

[75] Inventors: Harold R. Kunz, Vernon; Paul J. Damiano, Manchester; Francis J. Luczak, Glastonbury, all of Conn.

[73] Assignee: United Technologies Corporation, Hartford, Conn.

[21] Appl. No.: 291,138

[22] Filed: Aug. 7, 1981

[51] Int. Cl.³ .......................... C25B 1/00; C25B 1/02; C25B 1/22
[52] U.S. Cl. .................................. 204/103; 204/128; 204/129; 204/130
[58] Field of Search ................ 204/130, 103, 128, 129

[56] References Cited

U.S. PATENT DOCUMENTS

| | | |
|---|---|---|
| 1,115,044 | 10/1914 | Washburn . |
| 1,628,792 | 5/1927 | Larison et al. . |
| 2,704,281 | 3/1955 | Appeli ................................ 252/413 |
| 2,921,018 | 1/1960 | Helmers et al. ..................... 208/114 |
| 2,945,822 | 7/1960 | Jacob ................................ 252/414 |
| 3,024,203 | 3/1962 | Strecker ............................. 252/413 |
| 3,093,597 | 6/1963 | Hill et al. ........................... 252/413 |
| 3,211,668 | 10/1965 | Yamamota .......................... 252/411 |
| 3,459,675 | 8/1969 | Crecelius et al. .................... 252/411 |
| 3,730,885 | 5/1973 | Makrides et al. .................... 210/30 |
| 3,859,417 | 1/1975 | Teller ................................ 423/244 |
| 4,259,302 | 3/1981 | Katz et al. .......................... 423/237 |

FOREIGN PATENT DOCUMENTS 701001 12/1964 Canada ..................................... 23/2

OTHER PUBLICATIONS

*Journal of the Electrochemical Society*, "The Effect of Ammonia on Hydrogen-Air Phosphoric Acid Fuel Cell Performance", by S. T. Szymanski et al., vol. 127, No. 7, Jul. 1980, pp. 1440-1444.

*Primary Examiner*—R. L. Andrews
*Attorney, Agent, or Firm*—Harry J. Gwinnell

[57] ABSTRACT

A continuous process of removing ammonia gas from a gas stream is disclosed. A bed of solid porous material is provided which is wetted with an acid and the ammonia gas is removed by reacting with the acid to form an ammoniated salt. The porous material containing the acid is held at an electrochemical potential sufficient to oxidize the ammoniated salt of the acid to produce nitrogen gas regardless of the content of the gas stream. The porous substrate can be flooded with an insulating layer to permit entry of only the formed salt and a barrier to the, for example, reducing gas, thereby improving the efficiency of the system.

11 Claims, 2 Drawing Figures

CONTINUOUS ELECTROCHEMICAL AMMONIA SCRUBBER

DESCRIPTION

Technical Field

The field of art to which this invention pertains is removing components from normally gaseous mixtures, and specifically the removal of ammonia from a gas stream.

Background Art

Fuel cells using acid electrolytes, such as phosphoric acid, suffer a performance decay when the fuel fed thereto typically contains more than 1.0 ppm, by volume, of ammonia gas, depending on the operating conditions of the cell. Note the *Journal of the Electrochemical Society* article, entitled "The Effect of Ammonia on Hydrogen-Air Phosphoric Acid Fuel Cell Performance" by S. T. Szymanski et al, Vol. 127, No. 7, July 1980, pages 1440-1444. Fuels containing greater than 1.0 ppm ammonia may be cleaned to acceptable levels upstream of the fuel cells using a state-of-the-art non-regenerable bed of material which reacts with the ammonia. In a commercial fuel cell power plant designed to operate virtually maintenance free for about five years, it is certainly not desirable and can be quite expensive if the scrubber material must be replaced several times during the five year period.

In the prior art, it is known that phosphoric acid reacts with ammonia to produce an ammoniated salt of the acid, and that a bed of phosphoric acid soaked porous support material can therefore be used to scrub ammonia from a gas stream. After a period of time, there is insufficient unreacted acid to adequately scrub the ammonia. Prior to that time, scrubbing is stopped and the bed is regenerated by causing the salt to decompose back to the acid and ammonia. The ammonia is thereupon expelled or evaporated from the bed.

Increasing the vapor pressure of ammonia in the bed is usually accomplished by heating the bed to a temperature above the temperature used during the scrubbing process. For example, U.S. Pat. No. 3,859,417 teaches desorbing various gases from a bed of scrubbing material by raising the temperature "at least 20° C., preferably 30°-60° C. above the maximum temperature at which absorption occurs" (Col. 9, 11 33-36). The scrubbed gas is then recovered. In Canadian Pat. No. 701,001, issued Dec. 29, 1964, scrubbed ammonia is recovered by raising "the temperature in the absorption by e.g. 100° C." (page 5, 11 4-6). While always requiring at least an increased temperature for desorption, the Canadian patent also teaches that desorption may be accelerated by a carrier or sweep gas such as nitrogen, hydrogen, air or water vapor. The object, once again, is to further reduce the vapor pressure of ammonia above the bed relative to the vapor pressure in the bed.

Another approach for the removal of ammonia gas from gas streams is described in U.S. Pat. No. 4,259,302. In this patent, which utilizes a phosphoric acid soaked porous carbon substrate, the scrubbing system is regenerated by passing an oxygen containing gas therethrough. Two scrubbing beds are used alternatively so that the process can continue without shutting down the system by batchwise regenerating the scrubber by switching from one bed to the other. While this approach represents an advancement in the art, it suffers from the disadvantage of not being a continuous process and requires oxygen for regeneration. The reason for this is that the oxygen is required for the oxidation of the formed ammonium dihydrogen phosphate using the porous carbon substrate as a catalyst.

DISCLOSURE OF INVENTION

The present invention is directed to the continuous removal of ammonia gas from a gas stream by providing a bed of solid porous material wetted with an acid and passing the ammonia containing gas over said substrate while holding the electrochemical potential of the substrate at a value sufficiently high to oxidize the formed ammoniated salt of the acid to produce nitrogen gas.

Another aspect of the invention is directed to performing such process on a porous electrode at the electrochemical potential described above covered with a flooded electron insulating layer which limits gas flow, but allows salt diffusion to the electrode. In such embodiment, the ammonia gas forms an ammoniated salt with acid contained in the insulating layer which salt diffuses through the insulating layer to the electrode where it reacts to form nitrogen gas.

The foregoing, and other features and advantages of the present invention, will become more apparent from the following description and accompanying drawing.

BEST MODE FOR CARRYING OUT THE INVENTION

Phosphoric acid is the preferred scrubbing medium in the scrubbing system according to the present invention because of its vapor pressure and chemical properties, although other acids, such as sulfuric acid, can also be used. The acid can be disposed on any solid, conductive porous support material which is both wettable by the acid and corrosion resistant to the acid. Carbon is an excellent support material for phosphoric acid since it is electron conductive and a relatively inexpensive phosphoric acid resistant material. The carbon may be in the form of particles or pellets, which may be activated or graphitized or a porous structure including a binder such as polytetrafluoroethylene. This carbon has a catalytic effect on the reaction involved in the regeneration of the bed.

When phosphoric acid is used, the chemical reaction involved in the scrubbing process is:

$$H_3PO_4 + NH_3 \rightarrow (NH_4)H_2PO_4 \qquad (1)$$

The product on the right is ammonium dihydrogen phosphate, an ammoniated salt of phosphoric acid. In the past, the bed has been batchwise regenerated by passing an oxygen containing gas therethrough. The effect of the oxygen is to convert the ammonium dihydrogen phosphate back to $H_3PO_4$ in accordance with the following equation:

$$2(NH_4)H_2PO_4 + 3/2O_2 \rightarrow 2H_3PO_4 + N_2 + 3H_2O \qquad (2)$$

However, with the process according to the present invention, the presence of oxygen is not necessary to regenerate the acid since the potential of the substrate is kept so high. This potential should be an ammonium phosphate oxidation potential, for example, about 0.7 to about 1.0 volt. Accordingly, the scrubber is regenerated constantly in the presence of the fuel (hydrogen) gas, and it is not necessary to change gases (i.e., $H_2$ to $O_2$) and batch regenerate the scrubber. This continuous operation represents a significant advance in this art. This reaction takes place as:

$$2(NH_4)H_2PO_4 \rightarrow 2H_3PO_4 + N_2 + 3H_2 \qquad (3)$$

which, broken into its half cell reactions, is:

$$2(NH_4)^+ \rightarrow N_2 + 8H^{30} + 6e^- \text{ (anode)}$$

$$6e^- + 6H^+ \rightarrow 3H_2 \text{ (cathode)}$$

While this invention has been described in terms of fuel cells, it should be noted that the process has application in any area where it is desired to remove ammonia gas from a reducing (e.g. hydrogen) gas stream.

Figure 1:
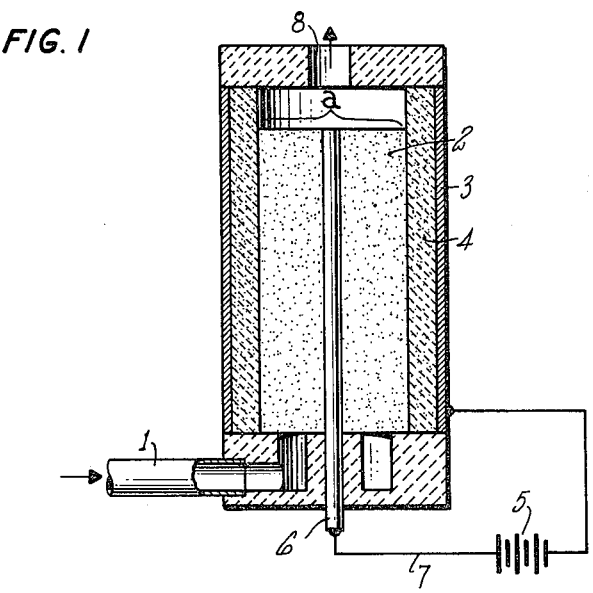
FIG. 1 demonstrates schematically the continuous regenerable scrubber according to the present invention.

In FIG. 1, a fuel gas containing ammonia enters inlet 1 as indicated by the arrow and is distributed over the porous carbon pellets containing phosphoric acid indicated as 2. A metal wall 3 which acts as the cathode surrounds the bed which is separated and insulated from the metal wall by a porous electronic insulator such as silicon carbide 4, also saturated with phosphoric acid. The imposed high potential (about 0.8 volt) is produced by an external voltage source 5 such as a battery, which connects the metal wall with a carbon rod 6 contained in the center of the scrubber through wire 7. After passing through the scrubbing bed 2, the fuel gas containing reaction product nitrogen exits at outlet port 8 as indicated by the arrow. In operation, the metal wall portion 3 acts as the cathode and the carbon rod 6 and porous carbon pellets 2 act as the anode portion (a) in the continuous electrochemical scrubber.

Figure 2:
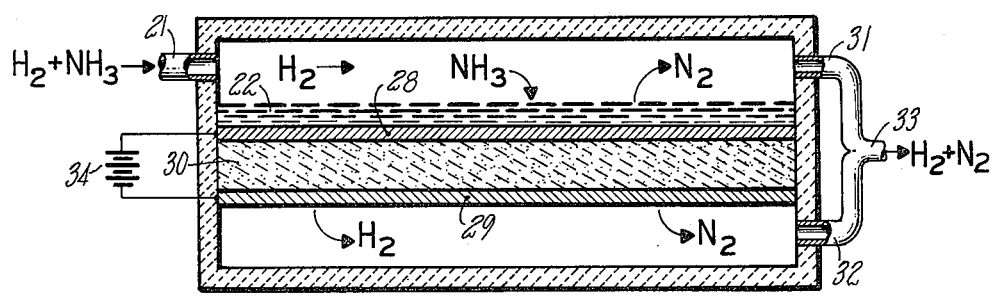
FIG. 2 demonstrates the flooded electron insulating layer embodiment of a scrubber according to the present invention.

In FIG. 2, which represents a second embodiment according to the present invention, fuel gas such as hydrogen contaminated with ammonia enters the inlet as indicated by the arrow at 21. The porous matrix material such as silicon carbide is indicated as 30, having a cathode 29, and an anode 28 imparted with an ammonium phosphate oxidizing potential by external voltage source 34, such as a battery. An electronic insulating layer 22 can be either a pool of phosphoric acid (or other non-electronic conducting acid) or such acid present in an acid resistant porous material such as silicon carbide material or a mat of fibers. The mat of fibers can be of silicon carbide or a polyaryl sulfone such as ASTREL ® (Minnesota Mining & Manufacturing Company). While the pool of acid is satisfactory for horizontal operation, the porous layer or mat is necessary for vertical operation. Only a limited amount of hydrogen will pass through the insulating layer, limited by the solubility of hydrogen in the acid. However, the ammonia will react with the acid and the salt will readily pass through to the anode. At this point, the anode electrochemical reaction described above takes place, and the matrix material 30 being porous to gases allows passage of the formed nitrogen which then proceeds out partial outlet tube 32 and main outlet tube 33, along with the hydrogen gas formed at the cathode. The nitrogen gas formed can also pass back out through the electronic insulating layer 22.

The cathode 3 of FIG. 1 may be made of a metal such as platinum or stainless steel, but is preferably a conductive structural member such as solid carbon. Such a carbon cathode can also have platinum supported on the carbon in amounts up to about 0.1 mg/cm². Similarly, the cathode 29 of FIG. 2 can be made of carbon, with or without a binder, and may also optionally include platinum in the amount described above. The anode 28 of FIG. 2 may also be made of carbon with or without a binder. And, the matrix 30 may also be made of the same polymer material (e.g. polyaryl sulfone) used optionally in the insulating layer 22.

While this invention has been described in terms of raising the electrochemical potential of the carbon bed to produce a continuously regenerable scrubber, it of course, would be within the purview of one skilled in this art to regenerate the scrubber by simply passing air therethrough without the electrochemical potential in a manner similar to that described in U.S. Pat. No. 4,259,302. The disadvantage, of course, would be that a batchwise system would have to be used as shown in the FIG. of U.S. Pat. No. 4,259,302, whereas the system as described herein with the electrochemical potential imposed on the carbon bed allows for scrubbing in a continuous manner without batchwise processing with regeneration while the scrubber is in operation.

Although this invention has been shown and described with respect to detailed embodiments thereof, it will be understood by those skilled in the art that various changes in form and detail thereof may be made without departing from the spirit and scope of the claimed invention.

We claim:

1. In the continuous removal of ammonia gas from a gas stream, the steps of providing a bed of solid porous material wetted with an acid, removing ammonia gas from the gas stream by reacting ammonia in the gas stream with the acid to form an ammoniated salt of the acid on said porous material, and continuously converting the ammoniated salt to acid, nitrogen gas and hydrogen gas by holding the porous material at an electrochemical potential sufficient to oxidize the ammoniated salt of the acid.

2. The process of claim 1 wherein the gas stream is hydrogen.

3. The process of claim 1 wherein the potential is about 0.7 to about 1.0 volt.

4. The process of claim 1 wherein the acid is phosphoric acid and the salt is ammonium dihydrogen phosphate.

5. The process of claim 1 wherein the solid porous material is carbon.

6. In the continuous removal of ammonia gas from a mixed gas stream, the steps of providing a layer of acid containing electronic insulating material selected from the group consisting of non-electronic conducting acid and a porous, acid resistant material impregnated with non-electronic conducting acid, next to a gas permeable porous anode having an electrochemical potential imposed thereon, flowing the ammonia containing gas across the insulating material to convert the ammonia to an ammoniated salt which passes through the material to the anode with substantially no penetration of gaseous components into the material, and continuously converting the ammoniated salt to acid, hydrogen gas and nitrogen gas by holding the porous anode at an electrochemical potential sufficient to oxidize the ammoniated salt of the acid.

7. The process of claim 6 wherein the gas stream contains hydrogen.

8. The process of claim 6 wherein the potential is about 0.7 to about 1.0 volt.

9. The process of claim 6 wherein the acid is phosphoric acid and the salt is ammonium dihydrogen phosphate.

10. The process of claim 6 wherein the porous anode is carbon.

11. The process of claim 6 wherein the acid containing electronic insulating material is selected from the group consisting of a pool of phosphoric acid, phosphoric acid impregnated silicon carbide and phosphoric acid impregnated polyaryl sulfone.

* * * * *